April 13, 1954
E. E. LOWBER
2,675,210
MEANS FOR RAISING THE WHEELS OF MOTOR VEHICLES
Filed Feb. 20, 1952
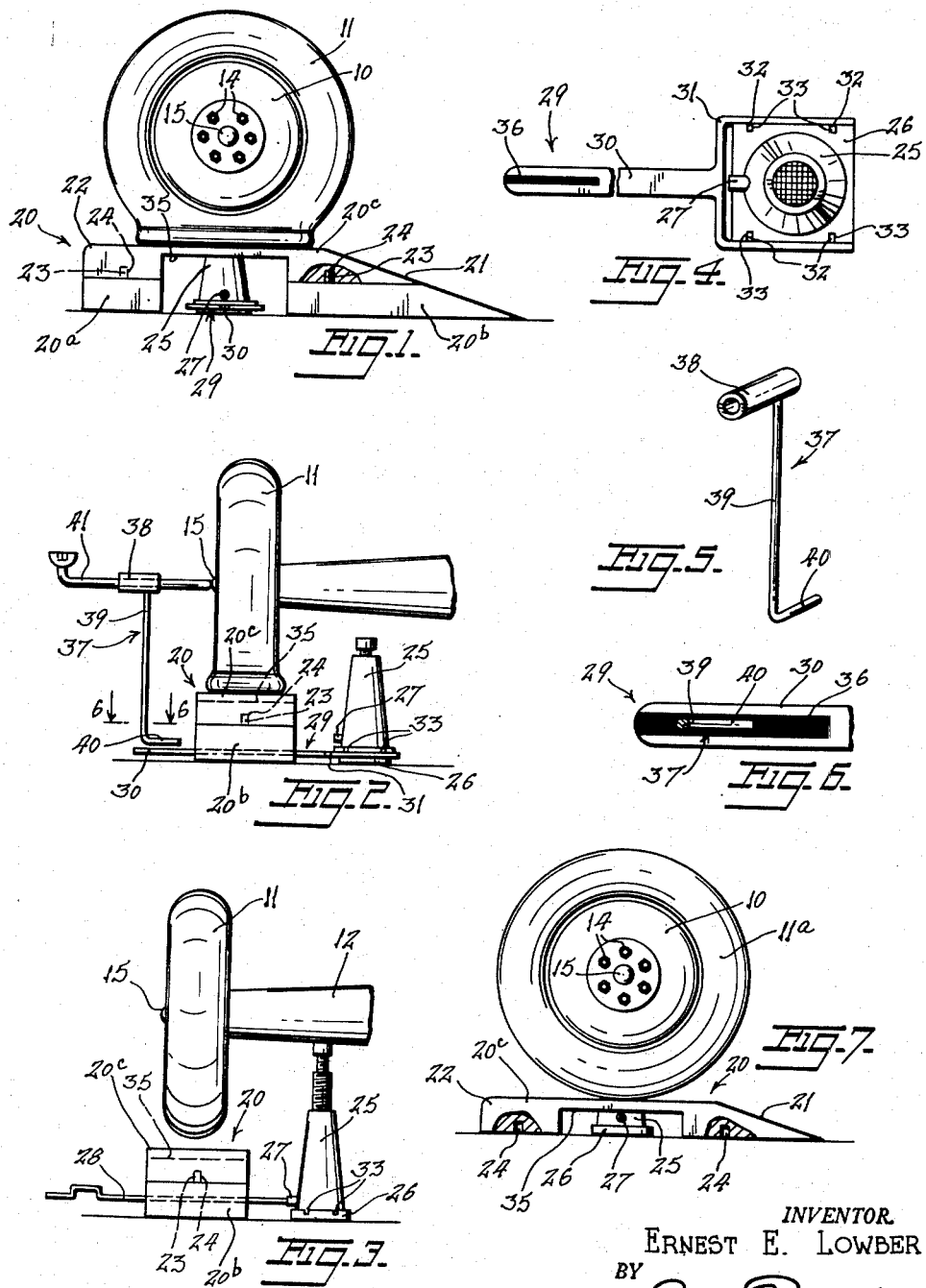
INVENTOR.
ERNEST E. LOWBER
BY
*[signature]*
ATTORNEY Patented Apr. 13, 1954

2,675,210

UNITED STATES PATENT OFFICE 2,675,210

MEANS FOR RAISING THE WHEELS OF MOTOR VEHICLES

Ernest E. Lowber, Staten Island, N. Y.

Application February 20, 1952, Serial No. 272,611

5 Claims. (Cl. 254—88)

1

This invention relates to new and useful improvements in means for raising the wheel of a motor vehicle.

It is common practice to equip motor vehicles with a so-called "bumper jack" to be used for raising the wheels of the vehicle for purposes of changing a flat tire, when rotating the tires to conserve rubber and for similar lifting purposes. Such jacks have proven objectionable because of the great amount of labor required to lift the weight of the car body off the springs before the wheel is lifted and because of the tendency of such jacks to tip over allowing the vehicle to drop to the ground—an objection particularly annoying when the wheel and tires are removed. Furthermore, such jacks require excessive stretching of the springs and shock absorbers associated with the wheel being raised, which if the wheel is raised a great number of times tends to reduce the life of the springs and shock absorbers.

The present day "bumper jacks" have come into use because of the excessive overhang of the conventional automobiles making it difficult to position a jack properly beneath the axle housing. In addition, the lower spring suspension of the new cars brings them too low for the old type screw jack to fit beneath. Thus, the primary object of the present invention is to make it possible to place the conventional screw jack beneath the axle or spring assembly notwithstanding the objectionable overhang and lower spring suspension and to make it possible to operate the jack from the side of the vehicle or from the front or back end thereof depending upon the amount of overhang.

Still further, the present invention proposes the construction of a wheel raising means having a ramp block and screw jack associated in a novel manner to be used for raising a vehicle wheel with a minimum of manual effort and a reduction in the excessive stretching of the springs and shock absorbers.

More specifically, the present invention proposes constructing the ramp block to have an inclined surface up which the wheel can be rolled using the motive power of the motor vehicle to raise the wheel the major portion off the ground after which the jack may be utilized to raise the wheel just slightly off the ramp block to permit its removal from beneath the wheel leaving the wheel suspended in the air with the weight of the vehicle carried only by the jack.

As a further object, the present invention proposes a novel arrangement for permitting the jack to be located directly beneath the longitudinal axis of the wheel axle from the outer side of the ramp block and without having to peer around the ends of the ramp block.

Still further, the present invention proposes constructing the ramp block of a pair of bottom sections and a top section superimposed on and connected to the bottom sections in a novel manner to be retained against relative movement when being used to raise a vehicle wheel having a flat tire and which can be quickly separated so that the upper section may be used independently of the bottom sections to relower the wheel when an inflated tire has been substituted or for raising an inflated tire as when the tires of a vehicle are being rotated.

It is a further object of the present invention to construct a wheel raising means for a motor vehicle which is simple and durable, which is effective for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawings forming a material part of this disclosure:

Fig. 1 is a side elevational view showing the wheel raising means of the present invention shown in the first step of raising a vehicle wheel.

Fig. 2 is an end elevational view showing a further step of raising the vehicle wheel.

Fig. 3 is a view similar to Fig. 2 showing the final step in the raising of the vehicle wheel.

Fig. 4 is a plan view of the jack with the positioner attached thereto as shown in Fig. 2.

Fig. 5 is a perspective view of the alignment tool, per se.

Fig. 6 is a partial horizontal sectional view taken on the line 6—6 of Fig. 2.

Fig. 7 is a view similar to Fig. 1 but illustrating only the top section of the ramp block when being used to lower a substituted inflated tire or to raise an inflated tire when rotating tires of a vehicle.

The vehicle wheel raising means, according to the present invention, may be conveniently used to raise any one of the front or rear wheels of a conventional motor vehicle regardless of its size and whether it be a private car, truck or bus. On the drawings, the wheel raising means is shown in combination with a vehicle wheel 10 having a flat tire 11. The wheel, as generally known in the art, is mounted on the end of an axle housed within an axle housing 12. The usual hub cap has been removed from the wheel 10 to expose the usual lugs 14 and the outer end of the axle 15. The wheel 10 might be the front or rear wheel of the vehicle located on either side of the same. Further constructional details of the wheel 10 or related parts of the motor vehicle will not be given in this disclosure and are generally known in the art.

The wheel raising means includes a ramp block 20 having an inclined surface 21 at one end thereof. The ramp is constructed to have three sections; a spaced pair of bottom sections 20ª and 20ᵇ and a top section 20ᶜ superimposed on the bottom sections. Each of the sections is made of a hard wood, a lightweight strong metal or any other similar material. The top section 20ᶜ has a rounded top corner 22 at its end remote from the inclined surface 21 so that the wheel 10 can be rolled off that end of the ramp block, if desired, without tilting the upper section 20ᶜ upward. With the sections 20ᶜ and 20ᵇ of the ramp block in proper alignment, the inclined surface 21 formed by the adjacent ends of those sections will be aligned providing a smooth surface up which the wheel 10 can be rolled.

Means is provided for retaining the sections 20ª, 20ᵇ and 20ᶜ against relative movement during the time that the wheel 10 is being rolled up the inclined surface. The retaining means comprises a spaced dowel 23 extended upward from the top face of each of the bottom sections 20ª and 20ᵇ and received within complementary recesses 24 formed in the bottom face of the top section 20ᶜ. The use of the dowels 23 and recesses 24 permit the top section 20ᶜ to be conveniently lifted off the top face of the bottom sections so that the top section 20ᶜ can be used independently of the bottom sections, as shown in Fig. 7.

The use of the dowels 23 on the bottom block sections 20ª and 20ᵇ for being fitted into the complementary recesses 24 in the bottom face of the top block section 20ᶜ illustrates but one method for joining the block sections. It is appreciated that keys and corresponding keyways, interfitting T-shaped projections and grooves and similar mechanical connectors can be used in place of the dowels and recesses without departing from the scope and intent of the present disclosure.

Thus, with the ramp block positioned in front of a front wheel of a vehicle or in rear of the rear of a vehicle, with the inclined surface 21 of the block facing the wheel, the motive power of the vehicle can be used to roll the wheel up the inclined surface of the block 20 until it rests on the top surface thereof, as shown in Fig. 1.

Provided for lifting the wheel 10 off the ramp block 20 a sufficient distance to permit the ramp block to be slipped from beneath the wheel, there is a jack 25 which is to be positioned at the inner side of the ramp block 20, as shown in Figs. 1 to 3. The jack 25 is of the conventional screw type having a flat base plate 26 for resting on the ground. At one side, the jack 25 has the usual socketed stem 27 to be engaged by the usual crank handle 28, see Fig. 3, for turning the jack 25 up and down. Further constructional details of the jack 25 will not be given in this description as such jacks are generally known in the art one type being shown, for example, in U. S. Patent No. 1,872,959 granted to Charles H. Johnson, et al.

Means is provided for aligning the vertical axis of the jack 25 with the longitudinal axis of the axle which mounts the wheel 10. The aligning means is characterized by a positioner 29 having an elongated handle 30 and a U-shaped portion 31 at one end thereof. The U-shaped portion 31 of the positioner 29 is dimensioned to fit snugly about the base plate 26 of the jack 25, as best shown in Fig. 4. The inner faces of the tines of the U-shaped portion 31 are provided with inwardly extended pins 32 for engagement in complementary recesses 33 formed in the base plate. The recesses 33 open to the top face and the outer edges of the base plate 26 so as to receive the pins 32. Extended upward from the bottom face of the top section 20ᶜ of the ramp block 20, in alignment with the space between the bottom block sections 20ª and 20ᵇ, there is a cutout 35. The handle 30 of the positioner 29 is of such a length that with the jack 25 positioned at the inner side of the ramp block 20 the free end of the handle 30 will extend through the clearance space formed by the spacing of the bottom sections 20ª and 20ᵇ and the cutout 35, when the assembled ramp block is used as shown in Figs. 1 to 3. On the other hand, when only the top section 20ᶜ of the ramp block is being used as shown in Fig. 7, then the free end of the handle 30 will be extended through the cutout 35 of the top block section. The extended end of the handle 30 of the positioner 29 can then be used to shift the position of the jack 25 relative to the axle housing 12.

The free end of the handle 30 which is to project beyond the outer face of the ramp block 20 is provided with a longitudinally extended mark or line 36, see Figs. 4 and 6. The mark or line 36 can be applied to the end of the handle 30 by painting, by milling or any other means which make the mark or line an integral part of the handle 30.

For use in connection with the positioner 29, there is an alignment tool 37. The alignment tool 37 consists of a sleeve 38 having a depending arm 39 provided with a right angularly bent bottom end portion 40. The bottom end portion 40 is extended exactly parallel to the longitudinal axis of the sleeve 38.

The sleeve 38 is of an internal diameter to have a sliding fit on an elongated bar 41, see Fig. 2. On the drawing, the bar 41 is the elongated handle of a conventional lug wrench of the type generally supplied with automobiles by the manufacturer for removing the lugs 14. With the sleeve 38 of the alignment tool 37 engaged on the bar 41, as shown in Fig. 2, the end of the bar 41 is positioned against the end of the axle 15 in end alignment therewith. With the bar 41 held in that position, the bottom end portion 40 of the arm 39 will be exactly parallel with the axis of the axle 15 and the axle housing 12. Using the other hand to grasp the extended end of the handle 30 of the positioner 29 the jack 25 is shifted until the mark or line 36 of the handle is extended exactly parallel to the bottom end portion 40 of the arm 39, as shown in Fig. 6. That will locate the vertical axis of the jack 25 immediately below the axis of the axle 15 and the axle housing 12. With the sleeve 38 in an identified position on the bar 41 it will spot the jack the correct distance inside the wheel.

The bar 41 is then removed from end of the axle 15 and the positioner 29 separated from the jack 25 or left attached thereto, as desired. The end of the crank 28 is then inserted into the socketed stem 27 and the jack carefully operated to engage the axle housing 12 and lift the wheel 10 so that the ramp 20 can be slipped out from beneath the tire. The wheel 10 will then be suspended with the expenditure of every little effort on the part of the person making the tire change.

The manner of using the wheel raising means is as follows:

The ramp block 20 is placed on the ground with its inclined surface 21 facing the wheel 10 to be raised. The jack 25 is placed on the ground at the inner side of the ramp block with the positioner 29 attached thereto and with the free end of the handle 30 extending through the clearance space provided in the ramp block. The driver then gets in the car and uses the motive power of the vehicle to roll the wheel 10 up the inclined surface 21 to a position on top of the block 20, as shown in Figs. 1 and 7. If a front wheel is being raised the car is driven forward and if a rear wheel is being raised the car is driven backward.

When the wheel is resting on the ramp block 20, as shown on the drawings, the positioner 29 and the alignment tool 37 are used to properly align the vertical axis of the jack 25 with the axis of the axle housing 12. The jack 25, using the crank 28, is then operated to extend the jack 25 and raise the wheel 10 off the ramp block 20 to a sufficient distance to permit the ramp block to be slipped from beneath the wheel. The wheel 10 having the flat tire 11 can then be changed for a wheel having an inflated tire 11a, as shown in Fig. 7 in the usual way.

To again lower the wheel 10, the top section 20c of the ramp block 20 is then positioned beneath the inflated tire 11a and the jack 25 turned using the crank handle 28, in a direction to lower the wheel 10 onto the top face of the top section 20c. The driver then gets onto the automobile and drives the car in a direction to roll the wheel down the inclined surface 21 on the top block section 20b. The changing of the tire is then completed.

The arrangement shown in Fig. 7 can also be used for raising a fully inflated tire as when the wheels of a vehicle are to be interchanged for the purpose of rotating the tires to conserve rubber. With the present high cost of tires, it is common practice to rotate the tires of an automobile every 2,000 or 3,000 miles in an effort to increase the normal life of the tires permitting greater mileage to be obtained. It will be appreciated that the device of the present invention permits the four wheels of an automobile to be changed with a considerable saving in effort required to raise the individual wheels off the ground.

As previously indicated, the primary function of the alignment tool is to insure the proper alignment of the vertical axis of the jack 25 with the axis of the axle 15. However, the alignment tool 37 can also be used to insure proper end alignment of the bar 41 with the axis of the axle 15. That can be accomplished by the turning of the alignment tool 37 to a horizontal position to extend laterally from either side of the bar 41. With the tool 37 in that position, the bar 41 can be turned about its end engaged against the end of the axle 15 to bring the length of the arm 39 into parallel alignment with the side of the wheel 10. While that arrangement will work especially well for the rear wheels of the vehicle it might not be too good for the front wheels unless there is some assurance that the front wheels are turned exactly forward; which is, of course, essential for proper alignment of the jack 25 with the front axle. The position of the front wheels can be checked using the alignment tool 37 in its horizontally turned position described supra, and noting the parallel alignment of the arm 39 with the sides of the vehicle and especially the outer sides of the front fenders. Following the use of the alignment tool 37 to obtain proper end alignment of the bar 41 with the wheel axle the tool is freed to drop by the action of gravity to its position depended from the bar 41 to be used for jack alignment purposes as previously described.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. Means for raising the wheel of a motor vehicle from which the hub cap has been removed to expose the end of the wheel axle, comprising a ramp block having an inclined surface up which the wheel can be rolled to rest on the block, a jack adapted to be positioned beneath the wheel axle inward of said ramp block, and means for positioning said jack with its vertical axis directly beneath the axis of the axle from the outer side of the ramp block, said ramp block having a cutout beneath the wheel, said positioning means comprising a positioner releasably connected to said jack and having an elongated handle extended through said cutout to the outer side of said ramp block, an elongated bar held in end alignment with the wheel axle, and an alignment tool adapted to be suspended from said elongated bar, said jack having a base plate, said positioner tool having a U-shaped portion at the inner end of said handle fitted snugly about said base plate, and means connecting said U-shaped portion to said base plate.

2. Means for raising the wheel of a motor vehicle from which the hub cap has been removed to expose the end of the wheel axle, comprising a ramp block having an inclined surface up which the wheel can be rolled to rest on the block, a jack adapted to be positioned beneath the wheel axle inward of said ramp block, and means for positioning said jack with its vertical axis directly beneath the axis of the axle from the outer side of the ramp block, said ramp block having a cutout beneath the wheel, said positioning means comprising a positioner releasably connected to said jack and having an elongated handle extended through said cutout to the outer side of said ramp block, an elongated bar held in end alignment with the wheel axle, and an alignment tool adapted to be suspended from said elongated bar, said jack having a base plate, said positioner tool having a U-shaped portion at the inner end of said handle fitted snugly about said base plate, and means connecting said U-shaped portion to said base plate, said connecting means comprising inwardly extended pins on the inner faces of the tines of said U-shaped member, said base plate having recesses into which said pins snugly fit.

3. Means for raising the wheel of a motor vehicle from which the hub cap has been removed to expose the end of the wheel axle, comprising a ramp block having an inclined surface up which the wheel can be rolled to rest on the block, a jack adapted to be positioned beneath the wheel axle inward of said ramp block, and means for positioning said jack with its vertical axis directly beneath the axis of the axle from the outer side of the ramp block, said ramp block having a cutout beneath the wheel, said positioning means comprising a positioner releasably connected to said jack and having an elongated handle extended through said cutout to the outer side of said ramp block, an elongated bar held in end alignment with the wheel axle, and an alignment tool adapted to be suspended from said elongated bar, said alignment tool comprising a sleeve adapted to slidably engage said bar, an arm depending from said sleeve, and a right angularly bent end portion on the lower end of said arm to overhang the extended end of said handle.

4. Means for raising the wheel of a motor vehicle from which the hub cap has been removed to expose the end of the wheel axle, comprising a ramp block having an inclined surface up which the wheel can be rolled to rest on the block, a jack adapted to be positioned beneath the wheel axle inward of said ramp block, and means for positioning said jack with its vertical axis directly beneath the axis of the axle from the outer side of the ramp block, said ramp block having a cutout beneath the wheel, said positioning means comprising a positioner releasably connected to said jack and having an elongated handle extended through said cutout to the outer side of said ramp block, an elongated bar held in end alignment with the wheel axle, and an alignment tool adapted to be suspended from said elongated bar, said alignment tool comprising a sleeve adapted to slidably engage said bar, an arm depending from said sleeve, and a right angularly bent end portion on the lower end of said arm to overhang the extended end of said handle, said right angularly bent end portion of said alignment tool being extended parallel to the axis of said sleeve.

5. Means for raising the wheel of a motor vehicle from which the hub cap has been removed to expose the end of the wheel axle, comprising a ramp block having an inclined surface up which the wheel can be rolled to rest on the block, a jack adapted to be positioned beneath the wheel axle inward of said ramp block, and means for positioning said jack with its vertical axis directly beneath the axis of the axle from the outer side of the ramp block, said ramp block having a cutout beneath the wheel, said positioning means comprising a positioner releasably connected to said jack and having an elongated handle extended through said cutout to the outer side of said ramp block, an elongated bar held in end alignment with the wheel axle, and an alignment tool adapted to be suspended from said elongated bar, said alignment tool comprising a sleeve adapted to slidably engage said bar, an arm depending from said sleeve, and a right angularly bent end portion on the lower end of said arm to overhang the extended end of said handle, said handle having a mark on its extended end extended parallel to the length of said handle for alignment with the right angularly bent bottom end portion of said stem in the properly aligned position of said jack with said axle.

References Cited in the file of this patent
UNITED STATES PATENTS

| Number | Name | Date |
| --- | --- | --- |
| 1,290,916 | Cramer | Jan. 14, 1919 |
| 1,872,959 | Johnson et al. | Aug. 23, 1932 |
| 1,922,555 | McCosh | Aug. 15, 1933 |
| 2,205,719 | Forehand | June 25, 1940 |
| 2,254,149 | Jensen | Aug. 26, 1941 |
| 2,556,796 | Care et al. | June 12, 1951 |